March 26, 1968   J. C. NEITZEL ETAL   3,374,505
AIRLINE SEPARATOR FOR SEED COTTON
Filed July 13, 1965   2 Sheets-Sheet 1

Joseph C. Neitzel
G. W. Dickson
INVENTORS

BY Bertram A. Mann
ATTORNEY

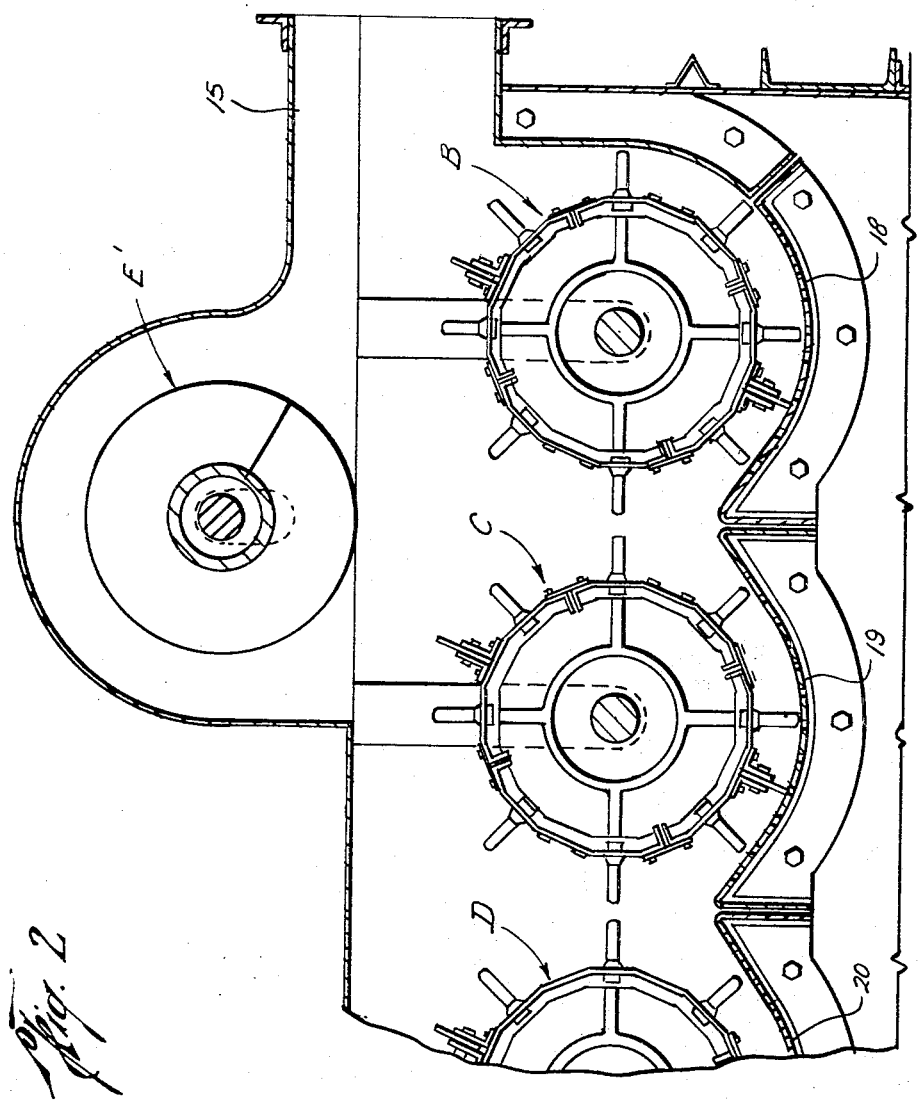

United States Patent Office 3,374,505
Patented Mar. 26, 1968

3,374,505
AIRLINE SEPARATOR FOR SEED COTTON
Joseph C. Neitzel, Dallas, and G. W. Dickson, Mesquite, Tex., assignors to The Murray Company of Texas, Inc., Dallas, Tex., a corporation of Texas
Filed July 13, 1965, Ser. No. 471,518
2 Claims. (Cl. 19—93)

ABSTRACT OF THE DISCLOSURE

A machine for separating air from seed cotton being fed into a gin house including a distributor at the entrance of the machine and a plurality of pronged rollers arranged side by side in the path of flow for keeping the cotton suspended in the feed passage, while the vehicle air passes downwardly through screens beneath the pronged rollers. The pronged rollers also carry wipers which pass over the screens to keep them clear of waste which may be caught thereby.

---

Figure 1:
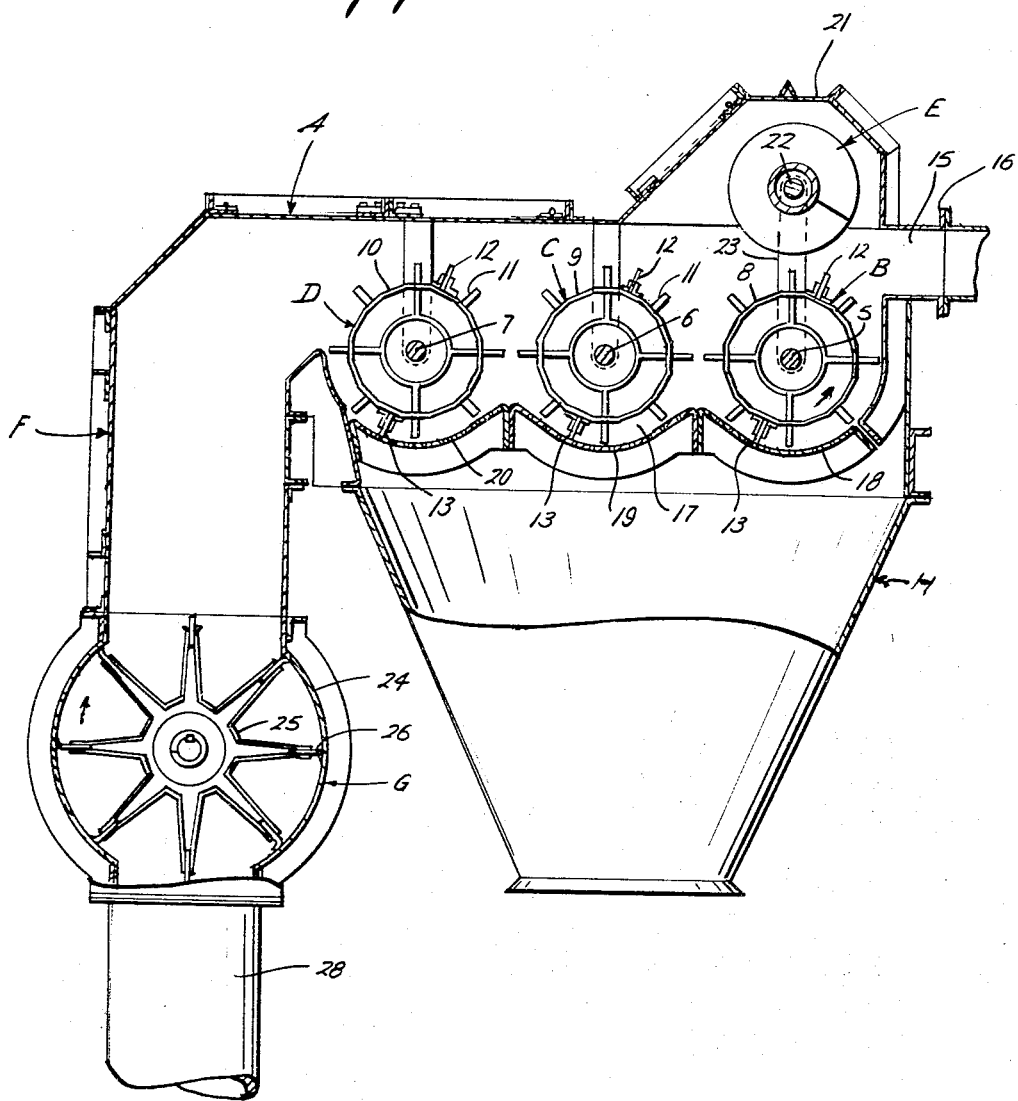

This invention relates to air separating and conveying devices for seed cotton entering the gin house.

Customarily, seed cotton is brought into the gin house from the wagons or other storage pneumatically through a flexible pipe or "telescope" and thence passes through separator and bunch-breaker devices to subsequent drying, cleaning, and other equipment. The difficulties of initial handling of the seed cotton in the gin plant have been greatly accentuated in recent years because of the greater percentage of trash, sticks, hulls, and other foreign matter in proportion to the seed cotton picked up by mechanical pickers. Furthermore, modern gin plants have substantially increased capacity so as to handle, for instance, twenty or twenty-five bales of seed cotton per hour. Previous separator devices have proved inefficient in the handling of machine-picked seed cotton and unable to deliver such cotton at rates adequate to keep the gin plant operating at full capacity. One reason for this is that in previous separators, the incoming, pneumatically-carried cotton and waste material is collected on a foraminous cylinder, while the vehicle air is drawn through the cylinder wall and discharged through the center thereof. The cotton and trash are then removed from the cylinder. Excessive bunches and wads tend to form within these devices and the flow of air is restricted because of the blockage of substantial parts of the foraminous cylinder by the cotton and waste material.

Accordingly, an object of the present invention is to provide a conveyor and air separator for seed cotton entering the gin house having greater capacity than previous separators.

Another object is to provide a separator in which the separating screen is kept clear of cotton and trash.

Another object is to provide a separator-conveyor in which the main stream of seed cotton remains suspended in the feed passage and thus clear of the screens at the bottom of the passage through which the air is exhausted.

Still another object is to provide means for evenly distributing the incoming seed cotton along the substantial width of the transport elements.

In accordance with the present invention, the pneumatically carried incoming seed cotton material is evenly dispersed transversely of the transport elements by a screw pitched oppositely at its opposite ends and is then carried along the upper part of the feed passage by successive pronged transport rollers which are caused to rotate in the direction for keeping the main stream of cotton suspended in the feed passage and away from the separating screens which underlie the rollers. The rollers also are provided with longitudinally-extending, radial blades which continuously wipe the underlying screens to keep them clear of lint and any other separated material which may tend to adhere to the screen.

In the accompanying drawings which illustrate the invention,

FIG. 1 is a vertical, longitudinal section through an exemplary embodiment of the invention; and FIG. 2 is a partial vertical longitudinal section illustrating a modification.

The apparatus shown in FIG. 1 consists of a casing A, forming a generally horizontal feed passage for seed cotton and of substantial width transversely of the plane of the paper and of sufficient length to accommodate three conveyor-separator rollers B, C, and D traversing casing A. The rollers are mounted on shafts 5, 6, and 7 powered by suitable means not shown which rotates the rollers counterclockwise. The walls 8, 9, and 10 of the rollers are generally cylindrical and imperforate and each is equipped with radial prongs, as at 11, and radially-projecting, rubber wiper blades extending therealong, as at 12 and 13.

At the righthand end of casing A, there is an inlet opening 15 for seed cotton and air flanged, as at 16, for connection to the flexible pipe or "telescope" usually provided for extension to the wagons being unloaded or other storage area. Casing A is generally open at the bottom, as at 17, and a hopper H depends therefrom forming an air outlet and for carrying away waste material as will be explained. A suction line (not shown) extends from hopper H for pneumatically drawing seed cotton through the inlet 15 and the air and fine trash downwardly through the air passage portion of casing A. Extending beneath each of rollers B, C, and D is a curved screen or other foraminous element, as 18, 19, and 20, the curves of these screens being generated about the axes of the rollers and the screens being positioned so as to be wiped by blades 12 and 13 during each revolution of the rollers.

Mounted transversely in a hood 21 about right hand roller B is a spreader-conveyor screw E having right hand and left hand thread portions extending oppositely from the center thereof so that material admitted through inlet 15 and striking the screw will be dispersed oppositely along forward roller B. Spreader-conveyor E is mounted on a shaft 22 which is powered by a suitable belt drive 23 as from roller shaft 5.

The feed passage in casing A, at its left hand end, opens into an outlet chute F which terminates at its lower end in a suction sealing box G including a generally cylindrical casing 24 within which rotates a ribbed wheel 25 carrying radial wipers 26 which engage the inner wall of casing 24 to carry solid material from chute F to a feeder inlet pipe 28, while sealing the feeder from the suction in casing A.

The spreader-conveyor may be located in various positions along casing A. FIG. 2 shows the spreader-conveyor screw E' shifted leftwardly from the position of this part in FIG. 1 and located between the first two rollers B and C.

In the use of the novel airline separator apparatus, the flanged inlet 15 is secured to the usual suction duct for drawing seed cotton with adhering hulls, leaves, sticks, and other trash, either from the wagons as freshly picked or from a storage area. The pneumatic stream thus admitted to casing A is initially directed above first separator roller B and, in the form in FIG. 1, concurrently against spreader-conveyor screw E which serves to evenly disperse the solid material in the pneumatic stream in opposite directions transversely of casing A and roller B so as to distribute this solid material substantially uniformly across the conveyor passage. As previously indicated, machine-picked cotton tends to be quite trashy and bunched. The incoming bunches or wads, in striking the conveyor screw E and in being struck by prongs 11 and wiper blades 12 on first roller B, are largely dissolved, e.g. broken up, and dissipated, while some finer trash is separated from the locks of seed cotton and, being heavier, tends to drop with the air stream onto and through screens 18, 19, and 20.

The main stream of seed cotton continues across the tops of counterclockwise rotating rollers B, C, and D, being thereby struck and directed so that the main stream of cotton is thrown into discharge chute F without having contacted screens 18, 19, and 20, whence it is delivered through vacuum box G to the feeder inlet 28 and subsequent treating equipment. The carrier air and fine trash are drawn downwardly through the screens and hopper 18 to the suction pump not shown, and trash is collected from the bottom of the hopper in a known manner.

The positioning of prongs 11 and the character of the seed cotton are such as to facilitate this cotton-directing action. At the same time, material tending to adhere to the screens, principally lint, is quickly wiped off by wiper blades 12 and 13 and returned to the stream of cotton at the top of the casing so that clogging of the screens is avoided. Consequently, the capacity of the apparatus for a given application of power by the suction pump is greatly increased over the capacity of previous devices in which the separator screen becomes substantially blocked by the incoming cotton. The capacity of the machine is also increased by the uniform distribution of the incoming seed cotton as well as the effective elimination of bunches and wads and the breaking up of the bolls at the entrance and along casing A. The resultant locks of seed cotton, thus loosened, are more easily transported by the spiked rollers B, C, and D and subject to more effective and efficient cleaning, drying, and ginning than heretofore.

The extent of screens 18, 19, and 20 and the number of rollers or cylinders B, C, and D may be varied, as to vary the capacity of the machine, and screen wiping means other than the rubber blades 12 and 13 may be provided. The invention may be modified in these and other respects as will occur to those skilled in the art, and the exclusive use of all modifications as come within the scope of the appended claims is contemplated.

We claim:
1. Cotton conveying apparatus comprising a feed duct for seed cotton having an inlet and an outlet and forming a pneumatic flow path therebetween, a screen in said flow path for separating cotton from the transport air in said duct, powered roller means in said duct having a portion abreast of said inlet for aiding in directing seed cotton material along said duct toward said outlet and clear of said screen, and a powered spreader conveyor in said inlet for dispersing seed cotton admitted through said inlet for delivery to said roller means.

2. Cotton conveying apparatus as described in claim 1 in which said powered roller means includes a roller located immediately in the path of material admitted through said inlet, said spreader conveyor being located above said roller means for assisting in breaking up compactions in the pneumatically conveyed material while dispersing such material along said roller means.

References Cited

UNITED STATES PATENTS

| | | | |
|---|---|---|---|
| 1,173,978 | 2/1916 | Johnston | 19—93 XR |
| 1,538,244 | 5/1925 | Hopkins | 19—205 XR |
| 2,024,469 | 12/1935 | Mitchell | 19—205 XR |
| 884,671 | 4/1908 | Lamb | 19—35 |
| 1,458,870 | 6/1923 | Foeller | 19—93 |
| 2,105,786 | 1/1938 | Henry | 19—91 |
| 2,169,782 | 8/1939 | Ahrens | 19—93 |
| 2,384,383 | 9/1955 | McDaniel et al. | 19—93 |
| 2,943,360 | 7/1960 | Hergeth et al. | 19—93 |

FOREIGN PATENTS 643,199   7/1962   Italy.

ROBERT R. MACKEY, *Acting Primary Examiner.*

I. C. WADDEY, *Assistant Examiner.*